US005971203A

United States Patent [19]

Bae

[11] Patent Number: 5,971,203

[45] Date of Patent: Oct. 26, 1999

[54] QUICK RELEASE VENT APPARATUS FOR A FUEL TANK

[75] Inventor: Kang-Soo Bae, Kyungki-Do, Rep. of Korea

[73] Assignee: Hyundai Motor Company, Seoul, Rep. of Korea

[21] Appl. No.: 08/953,831

[22] Filed: Oct. 13, 1997

[30] Foreign Application Priority Data

Oct. 21, 1996 [KR] Rep. of Korea ...................... 96-47243

[51] Int. Cl.[6] ........................................................ B65D 6/40

[52] U.S. Cl. ............................ 220/746; 137/38; 215/312; 220/89.1; 220/DIG. 33; 220/367.1; 220/203.19; 220/203.21

[58] Field of Search .............................. 137/38; 215/307, 215/309, 312, 315; 220/203.01, 203.19, 203.21, 367.1, 745, 746, 89.1, 86.2, DIG. 33

[56] References Cited

U.S. PATENT DOCUMENTS

| | | | |
|---|---|---|---|
| 1,363,263 | 12/1920 | Ohliger et al. | 220/203.21 X |
| 1,724,878 | 8/1929 | Jensen | 220/745 X |
| 2,835,411 | 5/1958 | Scheminger, Jr. | 215/309 X |
| 4,005,724 | 2/1977 | Courtot | 137/38 |
| 4,185,651 | 1/1980 | Paulson | 137/38 |
| 4,640,303 | 2/1987 | Greenberg | 137/38 |
| 4,685,584 | 8/1987 | Harris . | |
| 4,815,436 | 3/1989 | Saski et al. | 220/746 X |
| 5,279,439 | 1/1994 | Kasugai et al. | 220/DIG. 33 X |
| 5,449,018 | 9/1995 | Harris | 220/746 X |
| 5,540,347 | 7/1996 | Griffin | 220/DIG. 33 X |
| 5,738,132 | 4/1998 | Zakai et al. | 137/38 X |
| 5,794,806 | 8/1998 | Harris et al. | 220/DIG. 33 X |

*Primary Examiner*—Stephen K. Cronin
*Assistant Examiner*—Robin A. Hylton
*Attorney, Agent, or Firm*—Christie, Parker & Hale, LLP

[57] ABSTRACT

A vent apparatus of a fuel tank comprising a housing having a through-hole at the bottom communicating with a fuel tank; a valve body mounted on the housing, having a flange, vent slots and a partition wall; a lower cover mounted under the valve body, having a through-hole communicating with the through-hole of the housing and the lower space of the valve body; a ball for opening and closing the through-hole of the partition wall of the valve body; a pushing weight mounted on the upper compartment of the valve body, having a protrusion formed on its bottom to prevent adhesion of the ball to the partition wall of the valve body; and an upper cover positioned on the top of the housing, having a plurality of outlets around its periphery. The amount of the gas vapor to be discharged per unit time in proportion to the pressure of the gas vapor in the fuel tank is controlled to maintain a stable pressure in the fuel tank, and the prevention of fuel leakage via vent apparatus, in case that the automobile is overturned, is effectively enhanced.

6 Claims, 5 Drawing Sheets

50 60 51 61 70 52 24' 24 15 55 21 14 16 22 13 10 20 25 23 30 25' 5 40 5 32a 1 11 12 31

70
30
10
60
32a
31
32b

QUICK RELEASE VENT APPARATUS FOR A FUEL TANK

FIELD OF THE INVENTION

The present invention relates to a vent apparatus of a fuel tank for automobiles, more particularly, to a vent apparatus for smoothly discharging the gas vapor from a fuel tank and preventing fuel leakage in case of an upset by a sudden shock to an automobile, or when driving on a steep slope.

BACKGROUND OF THE INVENTION

In general, the generated gas vapor in the fuel tank should be discharged to the outside as the generated gas vapor increases the pressure in the fuel tank and leads to an explosion.

In order to discharge the generated gas vapor, a vent apparatus is installed in the fuel tank of the automobile. The vent apparatus, such as a fuel cap, prevents fuel leakage in the event of a sudden shock to the automobile. Such a fuel cap is disclosed in U.S. Pat. No. 4,685,584.

However, the conventional fuel cap has disadvantages in that the amount of the generated gas vapor to be discharged is limited by a time constraint. Therefore, the fuel cap cannot discharge all the generated gas vapor when the pressure of the fuel gas in the fuel tank is suddenly increased.

Further, when the fuel is smeared on a ball utilized for opening and closing a valve body, the ball adheres to the vent opening part due to the viscous property of the fuel so that the exhausted gas cannot be discharged properly through the vent opening on the rivet.

SUMMARY OF THE INVENTION

The present invention resolves the disadvantage of the prior art by providing a vent apparatus for discharging exhausted gas smoothly when the pressure of the fuel gas in the fuel tank suddenly increases.

An another object of the present invention is to provide a vent apparatus for preventing fuel leakage from the fuel tank when there is a sudden shock or driving on a steep slope, thus increasing the safety of an automobile.

According to the present invention, the above objects can be achieved by a vent apparatus of a fuel tank which comprises a housing having a through-hole at the bottom communicating with the fuel tank; a valve body mounted in the housing by a first supporting member and having a flange along its periphery, provided with a rubber ring thereunder; a partition wall separating the inner space of the valve body into two parts; a plurality of vent slots formed on the partition wall in a body part; a lower cover mounted under the valve body by being inserted into the lower part of the valve body, and having a through-hole communication with the through-hole of the housing and the lower part of the valve body; a ball to be positioned in the lower part of the valve body for opening and closing the through-hole of the partition wall of the valve body to prevent fuel leakage; a pushing weight mounted in the upper part of the valve body by a second supporting member; vent slots communicating with the vent slots of the valve body; protrusion formed on a bottom surface to prevent adhesion of the ball to the partition wall of the valve body; and an upper cover positioned on the top of the housing having a plurality of outlets on the peripheral thereof.

BRIEF DESCRIPTION OF THE DRAWINGS

The manner by which the above and other objects, features and advantages of the present invention are attained will become fully apparent from the following description to be made with reference to the accompanying drawings, in which.

DETAILED DESCRIPTION OF THE INVENTION

Figure 1:
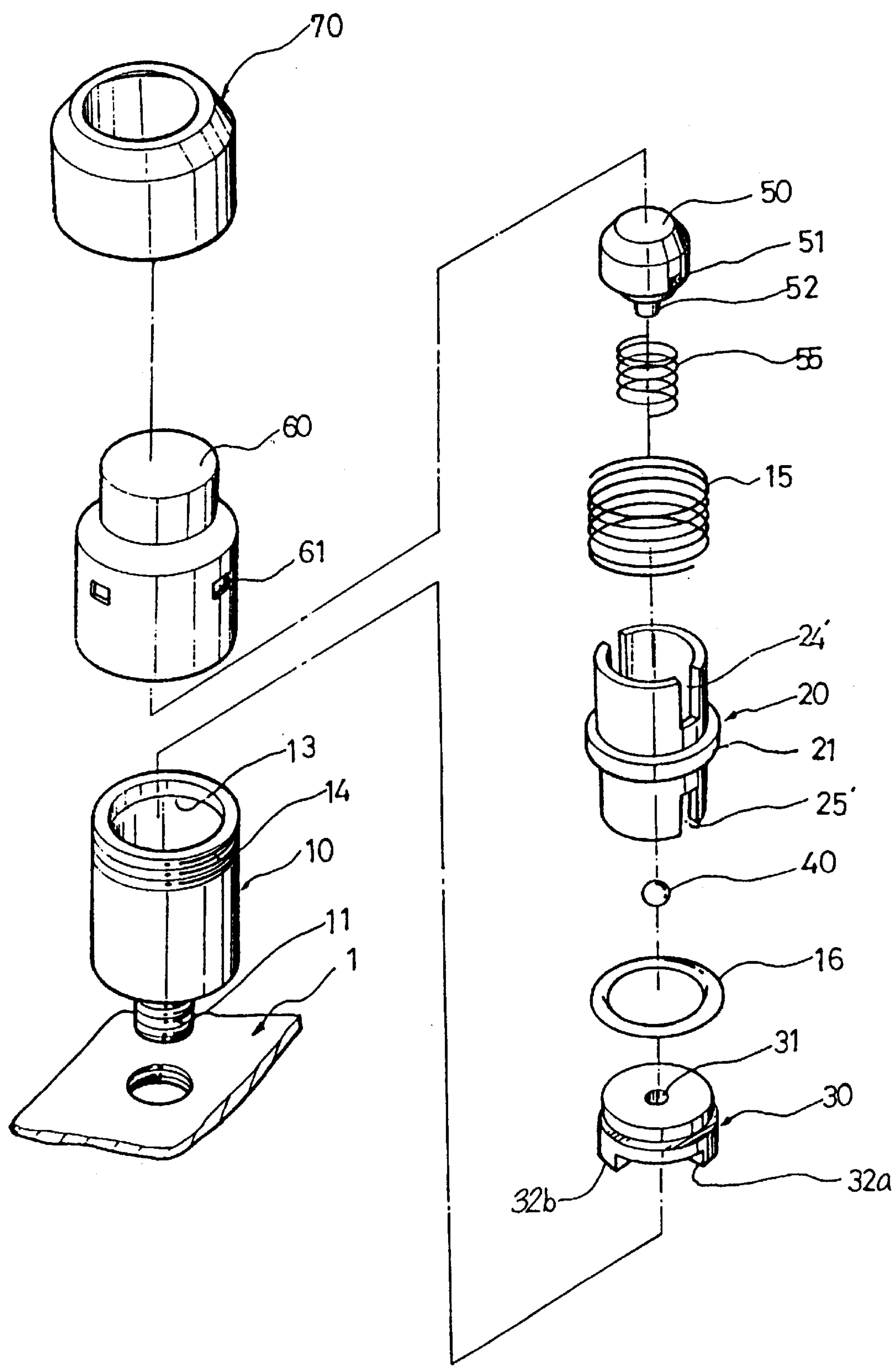
FIG.1 is a disassembled perspective view of a vent apparatus of a fuel tank according to the present invention.

The present invention will now be described in detail with reference to the drawings showing embodiments thereof.

FIG.1 to FIG.4 show the structure of a vent apparatus of automobiles according to the present invention.

A housing 10 is inserted in a hole on the upper end part of a fuel tank :. The housing 10 is provided with a thread 11 at its lower part to be engaged with a spiral hole of the fuel tank 1. The housing 10 is mounted on the fuel tank 1 via its thread 11. The housing 10 has a hole in the lower end part thereof to be communicated with the inside of the fuel tank 1.

The housing 10 has a shoulder portion 13 at its upper end for mounting a rubber ring 16 under the shoulder portion 13. On the periphery of the shoulder portion 13 there is an outer spiral thread 14 for mounting an upper cover 60.

A body 20 is mounted inside the housing 10. The valve body 20 has a flange 21 on the middle of its periphery. The first coil spring 15 is mounted from the upper surface of the flange 21 at one end part thereof. A rubber ring 16 is provided under the flange 21 to closely fit the valve body 20 with a housing 10.

The rubber ring 16 is pressed against the upper surface of the shoulder portion 13 of the housing 10 by the force of the first coil spring 15.

The valve body 20 has a partition wall 22 by which the inner space of the valve body 20 is divided into two compartments, an upper compartment 24 and a lower compartment 25. There is a predetermined clearance in the lower compartment 25 between the partition wall 22 of the valve body 20 and the inner wall of the housing 10.

The partition wall 22 has a through-hole 23 in the horizontal center.

A ball 40 for opening and closing the through-hole 23 is positioned on the through-hole 31 in the inner space surrounded by the partition wall 22 of the valve body 20 and the inner wall of the housing 10. Since the penetrated hole 23 of the partition wall 22 is located at the center of an internal downward incline, the ball 40 can be guided by the internal incline to the through-hole 23 when the fuel tank 1 is turned upside down in case of an accident, thereby preventing fuel spillage.

Further, the valve body 20 communicates with the external air via a plurality of slots 24' and 25'.

A lower cover 30 is inserted under the valve body 20. The lower cover 30 has a through-hole 31 which connects the through-hole 12 of the housing 10 with the lower inner compartment 25 of the valve body 20.

Figure 5:
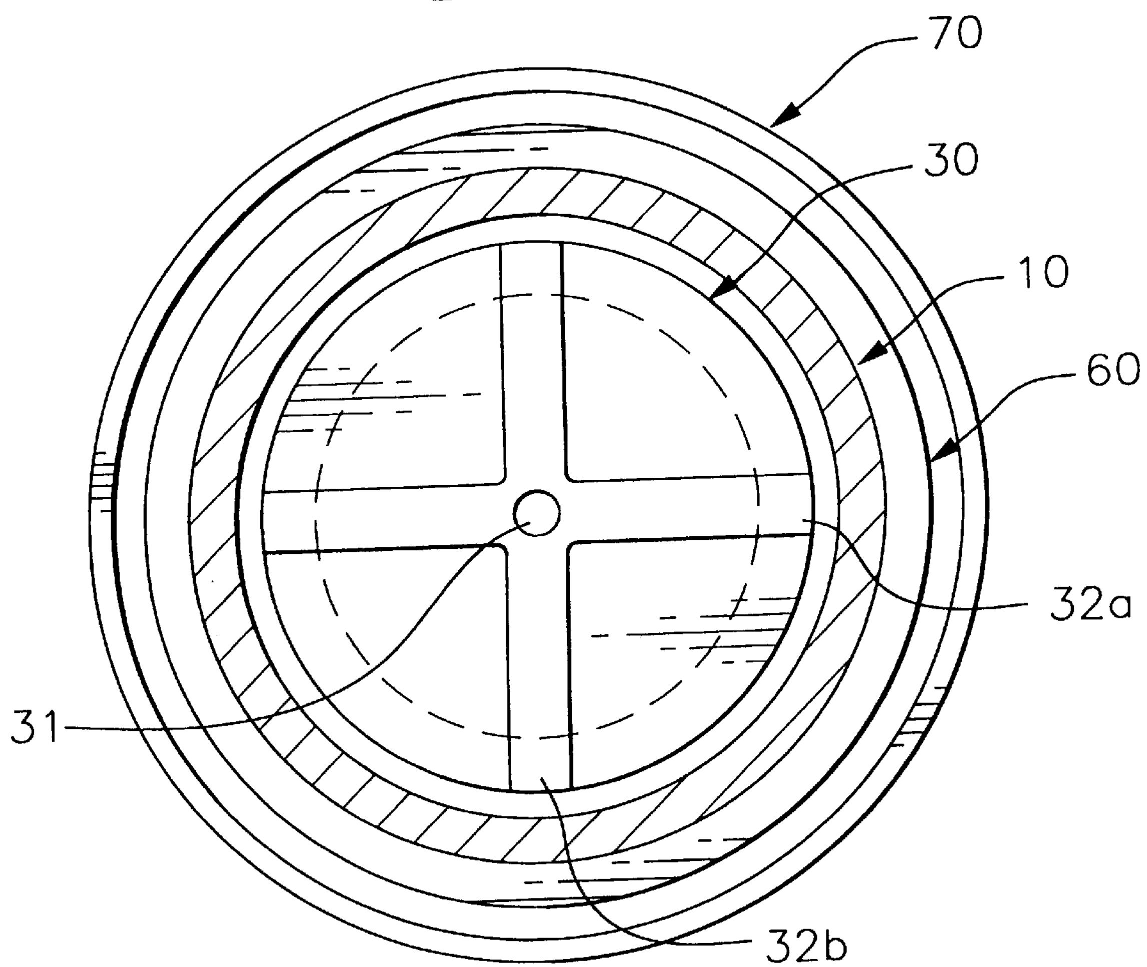
FIG. 5 is a cross-sectional view taken along line 5 of FIG. 2 showing the bottom of the lower cover with the cross-shaped supporting protrusion.

The fuel tank 1 is located under the lower cover 30 in the normal state, and the cross-shaped supporting protrusion 32*a*, 32*b* on the lower cover 30 secures a space in the housing 10 above the fuel tank 1, so that fuel gas introduced via the through-hole 12 of the housing 10 from the fuel tank 1 may flow in the space between the housing 10 and the lower cover 30 (see FIG. 5).

A pushing weight 50 is mounted in the upper compartment 24 of the valve body 20 by the second coil spring 55. The second coil spring 55 has a coefficient of elasticity large enough to move the pushing weight 50 in an up and down movement.

The pushing weight 50 has vent slots 51 at the corresponding positions of the vent slots 24' and 25' of the valve body 20 to be linked therewith, and the vent slots 51 communicate with the external air.

The pushing weight 50 also has a protrusion 52 for preventing the ball from adhering to the horizontal bottom surface of the partition wall 22, caused by the viscous property of the fuel.

Even though the ball 40 adheres to the bottom surface of the partition wall 22 and closes the through-hole 23 in the center of the bottom surface of the partition wall 22, as the pushing weight 50 moves up-and-down caused by the vibration of the automobile while it's moving, the pushing protrusion 52 is dropped down into the through-hole 23 and pushes the ball 40 from the through-hole 23 so that the open status of the through-hole 23 is maintained.

An upper cover 60 is positioned on the top of the housing 10 to shelter the inside of the housing 10. The upper cover 60 has a plurality of outlets on the periphery thereof to externally discharge the gas vapor from the fuel tank 1. In order to prevent the outlets 61 from being directly exposed to the external, a dust cover 70 is put on the upper cover 60.

The operation of the vent apparatus constructed as above is explained in detail hereinafter.

Figure 2:
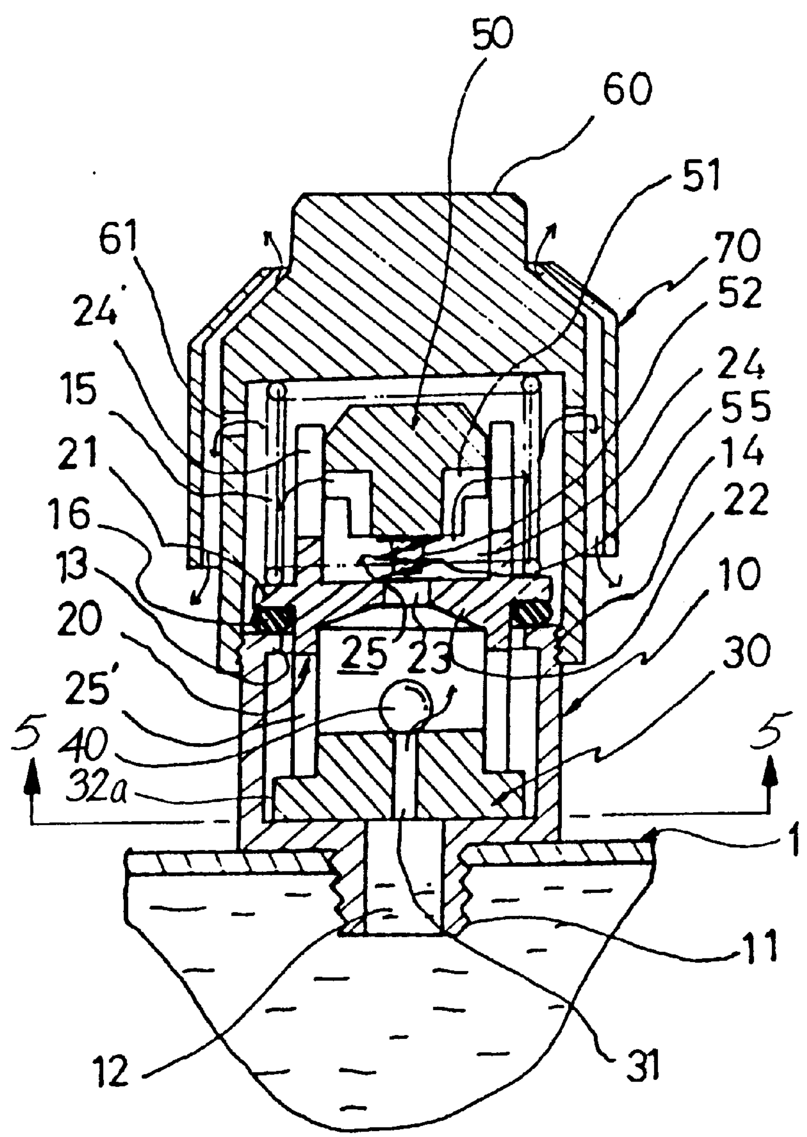
FIG.2 is an axial sectional view which shows the structure of the vent apparatus of a fuel tank according to the present invention.

FIG. 2 shows the structure of the vent apparatus for explaining the discharging operation of the gas vapor from the fuel tank 1.

In FIG. 2, the gas vapor generated in the fuel tank 1 is introduced into the inside of the housing 10 through the through-hole 12. The gas vapor is introduced into the lower compartment 25 of the valve body 20 via the through-hole 31 of the lower cover 30 when the through-hole 31 is not closed by the ball 40.

Additionally, the gas vapor is transmitted to the space above the housing 10 via the clearance secured by the supporting protrusion 32*a*, 32*b* of the lower cover 30. The gas vapor is also introduced into the lower compartment 25 of the valve body 20 via the vent slot 25' and transmitted to the upper compartment 24 of the valve body 20 via the through-hole 23 in the partition wall 22.

The gas vapor introduced into the upper space 24 in the valve body 20 is transmitted to the upper cover 60 via the vent slot 24' and externally discharged via the outlets 61.

When the pressure inside the fuel tank 1 increases, the amount of the gas vapor to be discharged has to be increased per unit time in order to decrease the increased pressure in the fuel tank to its normal state.

Figure 3:
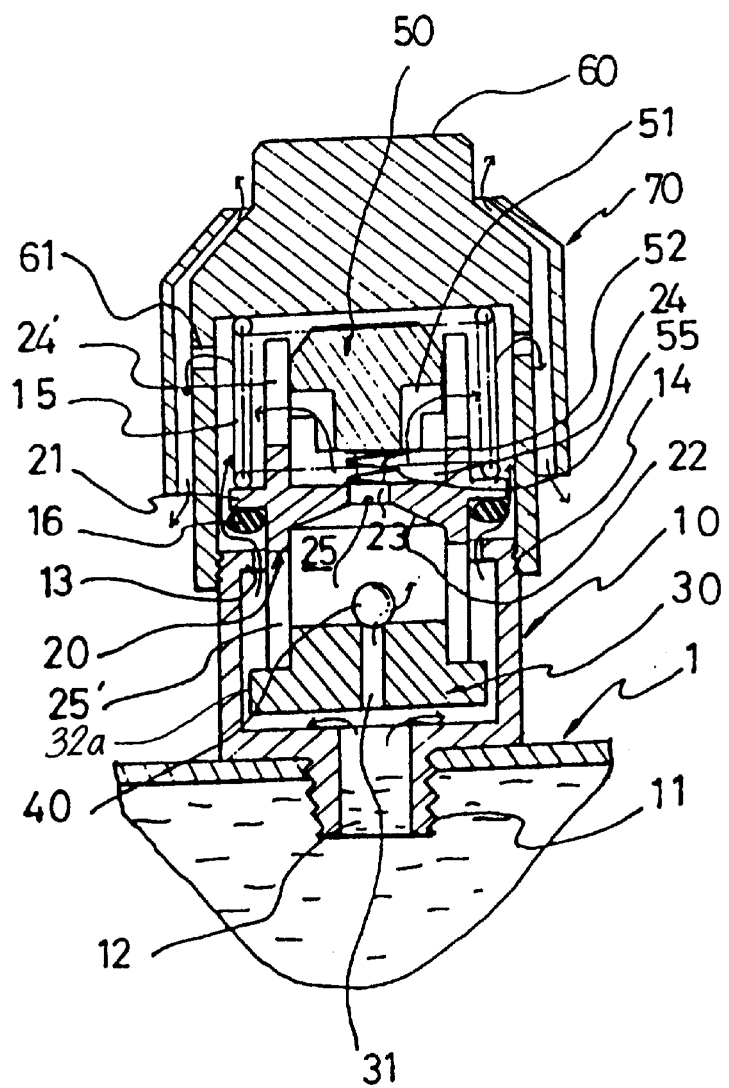
FIG.3 is an sectional view for explaining the operation of the vent apparatus when an automobile is driving on a steep inclined road and a fuel tank is slanted.

As shown in FIG. 3, when the pressure inside the fuel tank 1 increases, the pressure is applied to the lower cover 30 and the valve body 20 moves upwardly against the resilient force of the first coil spring 15.

In response to the upward movement of the valve body 20, the rubber ring 16 is dropped from the shoulder portion 13 of the housing 10 so that the inside of the housing 10 and the inside of the upper cover 60 are in communication with each other, and a huge amount of gas vapor may be discharged through the common space between the housing 10 and the upper cover 60.

The gas vapor may be discharged through the process described above. Hence, the total amount of fuel gas to be discharged per unit time is effectively increased.

In this case, since the degree of the upward movement of the valve body 20 is controlled by the pressure of the gas vapor, the amount of gas vapor discharged per unit time is proportional to the pressure of the gas vapor.

Figure 4:
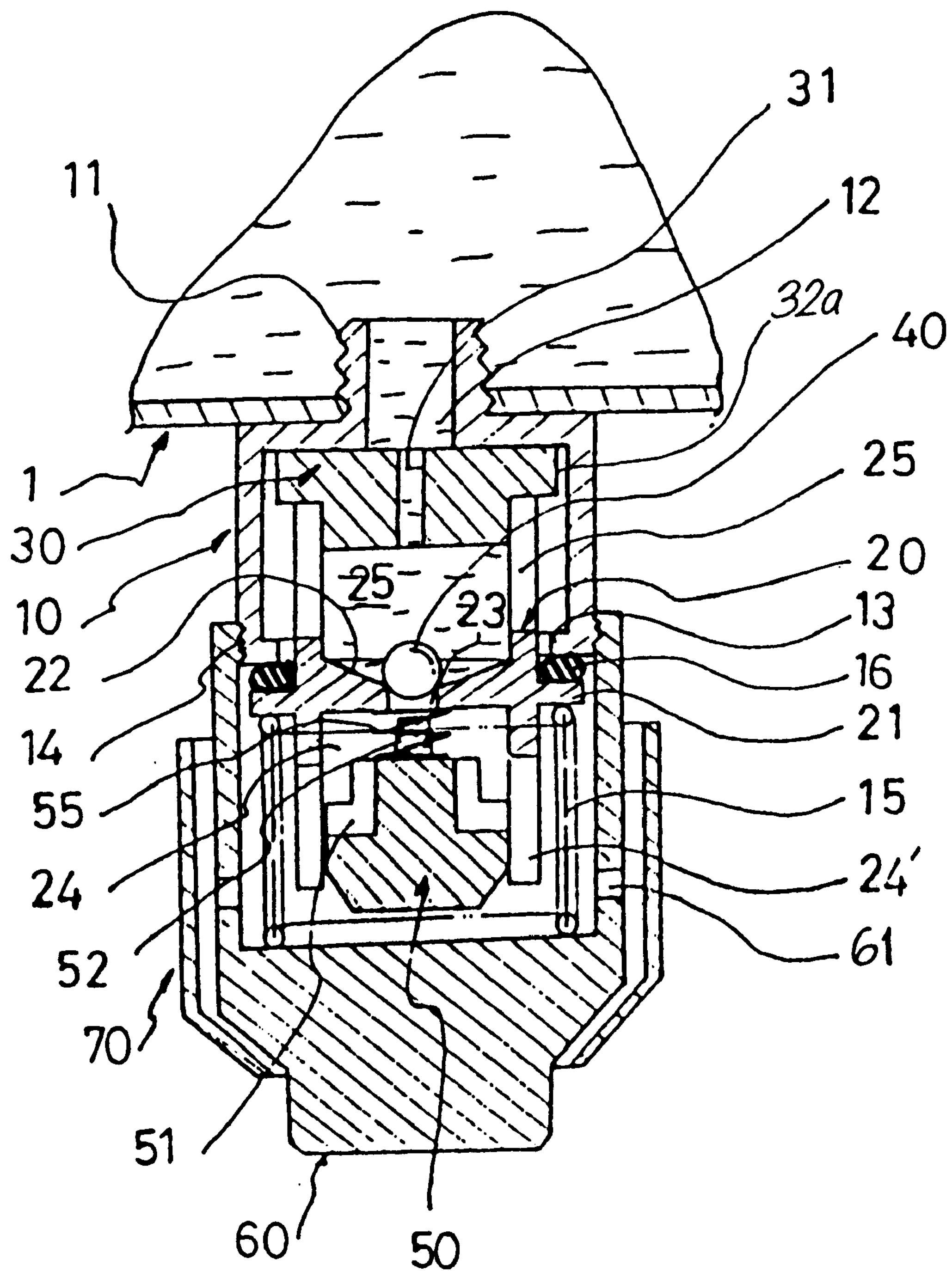
FIG.4 is an operational view for explaining the operation of the vent apparatus when there is a sudden shock to the automobile and the fuel tank.

In FIG. 4, as the fuel tank 1 is turned upside down, the ball 40 closes the through-hole 23 in the partition wall 22. Therefore, the fuel in the fuel tank 1 cannot be leaked even though the fuel is introduced into the inside of the housing 10 and the lower compartment 25 of the valve body 20.

Further, the rubber ring 16 is tightly fitted to the shoulder portion 13 of the housing 10 by the resilient force of the first coil spring 15, and the fuel cannot leak out through vent slots 24' of the valve body 20 and the vent slots 51 of the pushing weight 50.

According to the present invention as described hereinabove, the vent apparatus controls the amount of the gas vapor to be discharged per unit time in proportion to internal pressure in the fuel tank, so that the pressure in the fuel tank may be maintained stable, and fuel leakage, in case the automobile is overturned, may be prevented.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A vent apparatus for a fuel tank comprising:

a housing having a through-hole for communicating with such fuel tank;

a valve body mounted in said housing by a first coil spring, having a flange along the periphery thereof with a rubber ring thereunder, a partition wall having a through-hole and separating internal space of said valve body into upper and lower compartments and a plurality of vent slots around said valve body;

a lower cover mounted under said valve body in the lower compartment in said valve body, and having a through-hole communicating with the through-hole of said housing and communicating with the lower compartment of said valve body;

a ball positioned in the lower compartment of said valve body for opening and closing the through-hole of the partition wall of said valve body to prevent fuel leakage;

a pushing weight mounted in the upper compartment of said valve body by a second coil spring, having vent slots communicating with the vent slots of said valve body, and a pushing protrusion formed on a bottom surface thereof to prevent adhesion of said ball to the partition wall, at the through-hole of said partition wall, of said valve body; and an upper cover positioned on said housing having a plurality of outlets around a periphery of said upper cover.

2. The vent apparatus as claimed in claim 1 wherein the partition wall of said valve body inclines downward from the through-hole located in a center of the partition wall to guide said ball to said through-hole in said partition wall when such fuel tank is turned upside down.

3. The vent apparatus as claimed in claim 1 wherein said housing further comprises a shoulder portion;

wherein said rubber ring tightly fits to the shoulder portion of said housing by the resilient force of the first coil spring.

4. The vent apparatus as claimed in claim 1 further comprising a dust cover positioned on the upper cover to prevent direct external exposure of the outlets.

5. The vent apparatus as claimed in claim 1 wherein there is a clearance between said housing and said valve body for the flow of the fuel gas vapor.

6. The vent apparatus as claimed in claim 1 wherein said lower cover has a cross-shaped supporting protrusion formed downwardly on a lower surface thereof to secure a space between said lower cover and said housing.

* * * * *